United States Patent
Rekeita et al.

(10) Patent No.: US 6,189,063 B1
(45) Date of Patent: Feb. 13, 2001

(54) METHOD AND APPARATUS FOR INTELLIGENT CONFIGURATION REGISTER ACCESS ON A PCI TO PCI BRIDGE

(75) Inventors: David W. Rekeita, McKinney; Krunali Patel, Plano; David E. Dickens, Dallas, all of TX (US)

(73) Assignee: Texas Instruments Incorporated, Dallas, TX (US)

( * ) Notice: Under 35 U.S.C. 154(b), the term of this patent shall be extended for 0 days.

(21) Appl. No.: 09/162,702

(22) Filed: Sep. 29, 1998

Related U.S. Application Data

(60) Provisional application No. 60/060,508, filed on Sep. 30, 1997.

(51) Int. Cl.$^7$ .............................. G06F 9/445; G06F 13/10; G06F 12/00
(52) U.S. Cl. ......................... 710/130; 710/129; 710/128; 710/8; 370/402
(58) Field of Search ..................................... 710/126, 129, 710/130, 128, 100, 101, 104, 2, 8; 711/103; 370/401, 402; 395/500.44

(56) References Cited

U.S. PATENT DOCUMENTS

| | | | |
|---|---|---|---|
| 5,568,619 | * | 10/1996 | Blackledge et al. . |
| 5,913,045 | * | 6/1999 | Gillespie et al. . |
| 5,930,496 | * | 7/1999 | MacLaren et al. . |
| 5,968,156 | * | 10/1999 | Kim . |
| 5,983,303 | * | 11/1999 | Sheafor et al. . |

\* cited by examiner

Primary Examiner—Gopal C. Ray
(74) Attorney, Agent, or Firm—W. Daniel Swayze, Jr.; Wade James Brady III; Frederick J. Telecky, Jr.

(57) ABSTRACT

A method and apparatus for intelligent configuration register access on a PCI to PCI bridge (38) are provided. A read to configuration information of a connected PCI device (30) is identified. It is then determined whether the connected PCI device (30) is one for which the read should be trapped. If the read should not be trapped, the read is passed on to the connected PCI device (30). If the read should be trapped, the type of PCI device is determined for the connected PCI device (30). Data is then returned representing the configuration information in a format appropriate for the type of PCI device. In one aspect, the configuration information comprises the subsystem ID and subsystem vendor ID of the PCI device.

28 Claims, 5 Drawing Sheets

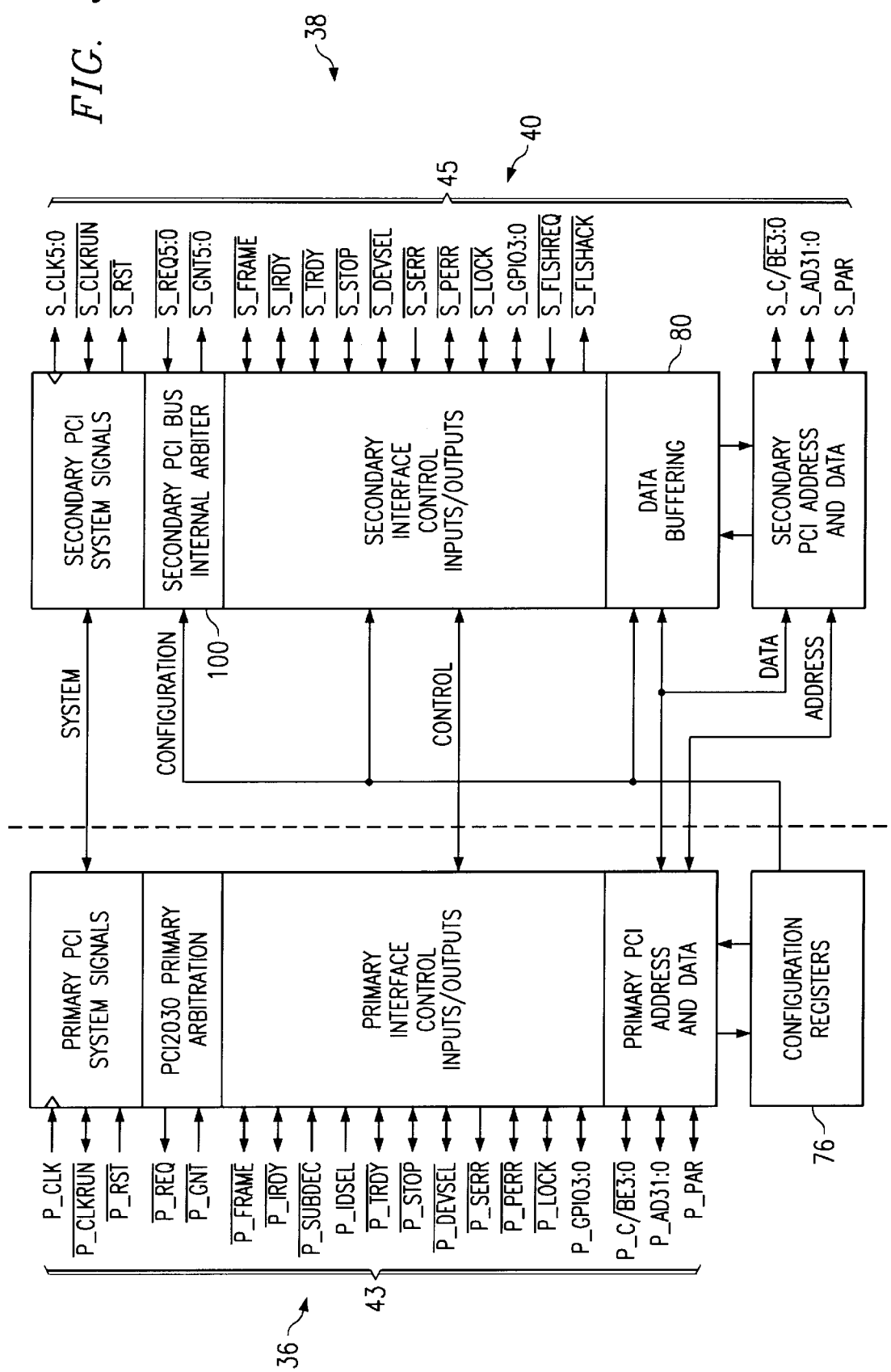

FIG. 4A

| BYTE 3 | BYTE 2 | BYTE 1 | BYTE 0 | DOUBLEWORD NUMBER (IN DECIMAL) |
|---|---|---|---|---|
| DEVICE ID | | VENDOR ID | | 00 |
| STATUS REGISTER | | COMMAND REGISTER | | 01 |
| CLASS CODE | | | REVISION ID | 02 |
| BIST | HEADER TYPE | LATENCY TIMER | CACHE LINE SIZE | 03 |
| BASE ADDRESS 0 | | | | 04 |
| BASE ADDRESS 1 | | | | 05 |
| BASE ADDRESS 2 | | | | 06 |
| BASE ADDRESS 3 | | | | 07 |
| BASE ADDRESS 4 | | | | 08 |
| BASE ADDRESS 5 | | | | 09 |
| CARD BUS CIS POINTER | | | | 10 |
| SUBSYSTEM ID | | SUBSYSTEM VENDOR ID | | 11 |
| ESPANSION ROM BASE ADDRESS | | | | 12 |
| RESERVED | | | | 13 |
| RESERVED | | | | 14 |
| MAX_LAT | MIN_GNT | INTERRUPT PIN | INTERRUPT LINE | 15 |

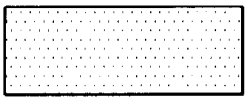 REQUIRED CONFIGURATION REGISTERS

*FIG. 4B*

| BYTE | | | | DOUBLEWORD NUMBER (IN DECIMAL) |
|---|---|---|---|---|
| 3 | 2 | 1 | 0 | |
| DEVICE ID | | VENDOR ID | | 00 |
| STATUS REGISTER | | COMMAND REGISTER | | 01 |
| CLASS CODE | | | REVISION ID | 02 |
| BIST | HEADER TYPE | LATENCY TIMER | CACHE LINE SIZE | 03 |
| CARDBUS SOCKET REGISTERS/ EXCA BASE ADDRESS REGISTER | | | | 04 |
| SECONDARY STATUS | | RESERVED | | 05 |
| CARDBUS LATENCY TIMER | SUBORDINATE BUS NUMBER | CARDBUS BUS NUMBER | PCI BUS NUMBER | 06 |
| MEMORY BASE REGISTER 0 | | | | 07 |
| MEMORY LIMIT REGISTER 0 | | | | 08 |
| MEMORY BASE REGISTER 1 | | | | 09 |
| MEMORY LIMIT REGISTER 1 | | | | 10 |
| OPTIONAL UPPER HALF | | I/O BASE REGISTER 0 LOWER HALF | | 11 |
| OPTIONAL UPPER HALF | | I/O LIMIT REGISTER 0 LOWER HALF | | 12 |
| OPTIONAL UPPER HALF | | I/O BASE REGISTER 1 LOWER HALF | | 13 |
| OPTIONAL UPPER HALF | | I/O LIMIT REGISTER 1 LOWER HALF | | 14 |
| BRIDGE CONTROL | | INTERRUPT PIN | INTERRUPT LINE | 15 |
| SUBSYSTEM ID | | SUBSYSTEM VENDOR ID | | 16 |
| OPTIONAL 16-BIT PC CARD LEGACY MODE BASE ADDRESS | | | | 17 |
| RESERVED | | | | 18-31 |
| VENDOR SPECIFIC | | | | 32-63 |

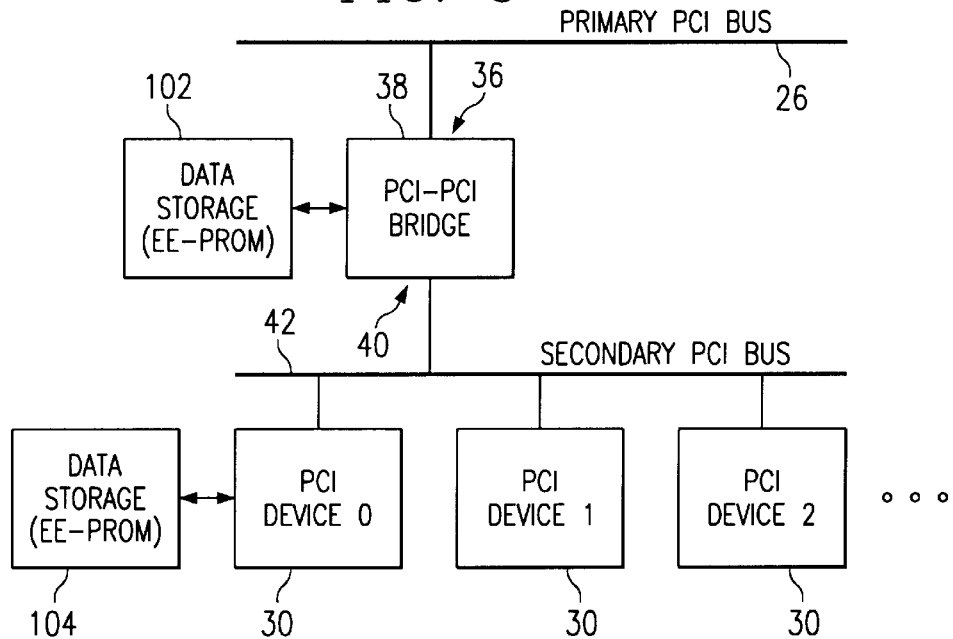
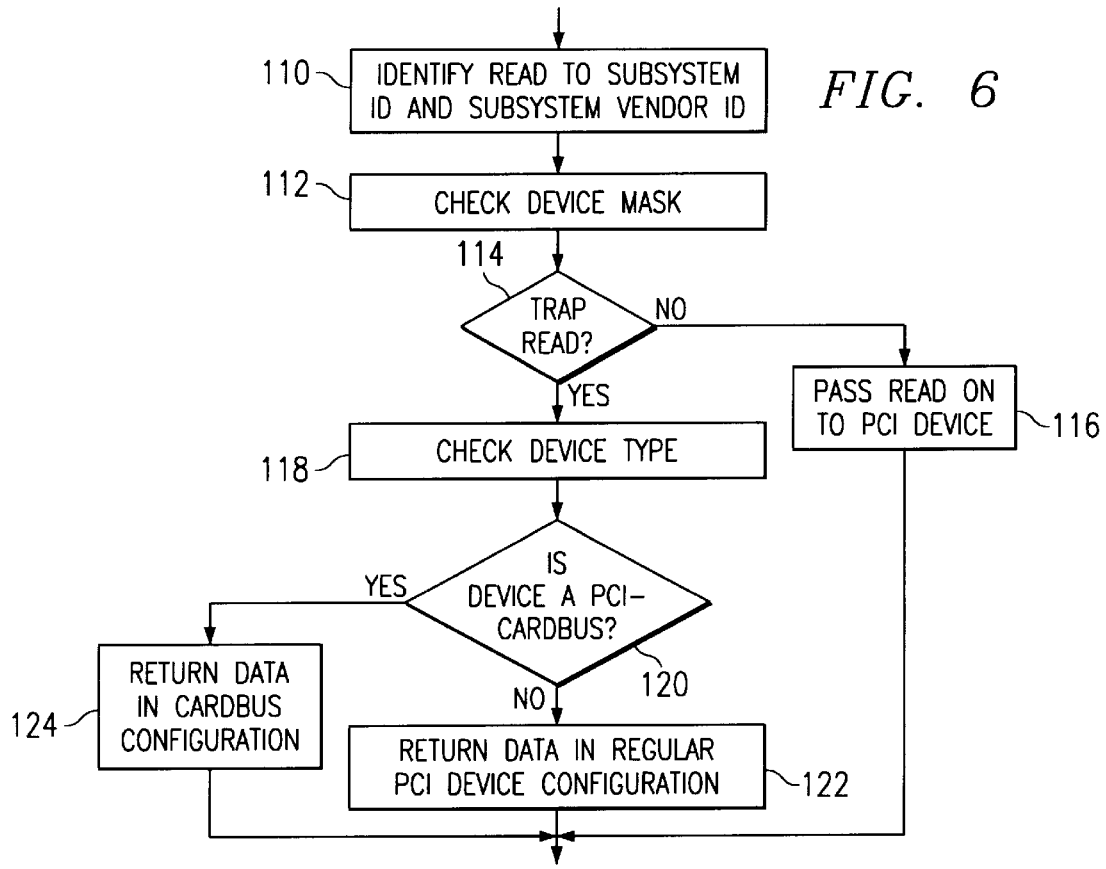

METHOD AND APPARATUS FOR INTELLIGENT CONFIGURATION REGISTER ACCESS ON A PCI TO PCI BRIDGE

This application claims priority under 35 USC §119(e)(1) of provisional application Ser. No. 60/060,508 filed Sep. 30, 1997.

TECHNICAL FIELD OF THE INVENTION

The present invention relates in general to the field of PCI to PCI bridge devices and more specifically to a method and apparatus for intelligent configuration register access on a PCI to PCI bridge.

BACKGROUND OF THE INVENTION

A peripheral component interconnect (PCI) bridge provides a connection path between two independent PCI buses. The primary function of a PCI to PCI bridge is to allow transactions to occur between a device on one PCI bus and a device on the other PCI bus. System and option card designers can use multiple PCI to PCI bridges to create an hierarchy of PCI buses. This allows system and option card designers to overcome electrical loading limits.

In a transaction between two PCI devices, the PCI device that initiates the transaction is called the master and the other PCI device is called the target. If the master and target are on different PCI buses, the bus that the master resides on is the initiating bus. The bus that the target resides on is the target bus.

A PCI to PCI bridge has two PCI interfaces, each connected to a PCI bus. The PCI interface of the PCI to PCI bridge that is connected to the PCI bus that is closest to the CPU is the primary interface. The PCI interface of the PCI to PCI bridge that is connected to the PCI bus that is farthest from the CPU is the secondary interface. Similarly, the PCI bus that is connected to the primary interface of the PCI to PCI bridge is called the primary PCI bus. The PCI bus that is connected to the secondary interface of the PCI to PCI bridge is called the secondary bus.

A PCI to PCI bridge acts essentially as an intermediary between devices located on the secondary bus and devices that are located on the primary bus. The two interfaces of the PCI to PCI bridge bus are capable of both master and target operations. The PCI to PCI bridge acts as a target on the initiating bus on behalf of the target that actually resides on the target bus. Similarly, the PCI to PCI bridge functions as a master on the target bus on behalf of the master that actually resides on the initiating bus. To devices located on the primary bus, the PCI to PCI bridge appears as one device where it actually represents several PCI devices that are located on the secondary bus. A detailed specification for PCI to PCI bridges is set forth in "PCI to PCI Bridge Architecture Specification", Revision 1.0, Apr. 5, 1994, PCI Special Interest Group, Hillsboro, Oreg.

With respect to PCI devices connected to a PCI bus, the PCI specification requires dynamic data to be loaded in configuration space of a PCI device prior to device initialization. An example of such configuration data is the subsystem ID and subsystem vendor ID registers of a PCI device. This data is used to uniquely identify an add-in board or subsystem where the PCI device resides. The data needs to be populated prior to BIOS or other system software accessing the PCI configuration space of the PCI device. A typical implementation is to have a serial EEPROM for each PCI device in the subsystem. The configuration data is then loaded from the serial EEPROM prior to system software execution. Each PCI device in the subsystem also needs to guarantee that the data is valid before allowing reads to the registers to complete. In general, conventional PCI devices need to implement the required configuration registers and some sort of mechanism to load valid data into the registers.

SUMMARY OF THE INVENTION

In accordance with the present invention, a method and apparatus for intelligent configuration register access on a PCI to PCI bridge are provided that substantially eliminate or reduce problems associated with previously developed PCI to PCI bridge devices.

The method and apparatus involve identifying a read to configuration information of a connected PCI device. It is then determined whether the connected PCI device is one for which the read should be trapped. If the read should not be trapped, the read is passed on to the connected PCI device. If the read should be trapped, the type of PCI device is determined for the connected PCI device. Data is then returned representing the configuration information in a format appropriate for the type of PCI device. In one aspect, the configuration information comprises the subsystem ID and subsystem vendor ID of the PCI device.

A technical advantage of the present invention is that a low-cost, intelligent scheme for configuration register access is provided that eliminates some overhead (e.g., cost, board area, complex design) for implementing and loading configuration registers. Further, there is no necessity for data storage, such as an EEPROM, to be associated with each PCI device in the subsystem.

Another technical advantage is that the PCI to PCI bridge device can handle configuration register access for older PCI devices that do not implement the required registers. Thus, such older PCI devices can work in newer systems that expect the configuration registers to be implemented.

Additional technical advantages should be readily apparent from the drawings, description, and claims.

BRIEF DESCRIPTION OF THE DRAWINGS

A more complete understanding of the present invention and advantages thereof may be acquired by referring to the following description taken in conjunction with the accompanying drawings in which like reference numbers indicate like features and wherein:

FIG. 3 is a functional block diagram of one embodiment of a PCI to PCI bridge that contains a secondary PCI bus internal arbiter according to the present invention;

FIGS. 4A and 4B are diagrams, respectively, of the PCI device configuration header format and the PCI-to-cardbus bridge configuration register format;

FIG. 5 is a block diagram of one embodiment of data storage associated with a PCI to PCI bridge and a connected PCI device; and FIG. 6 is a flowchart of one embodiment of a method for intelligent configuration register access according to the present invention.

DETAILED DESCRIPTION OF THE INVENTION

Figure 1:
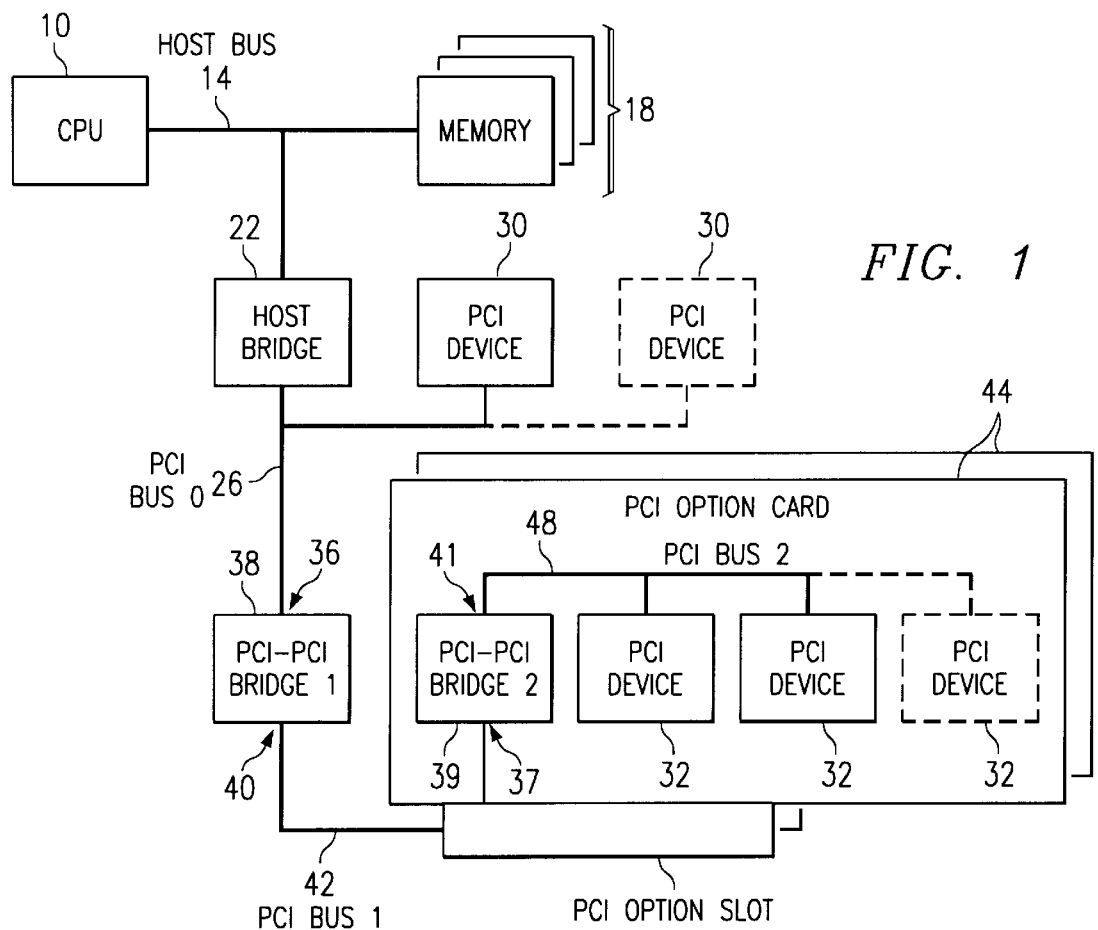
FIG. 1 is a block diagram of typical PCI to PCI bridge applications.

FIG. 1 is a block diagram of typical PCI to PCI bridge applications. A CPU 10 connects to memory 18 via host bus 14. A host bridge 22 connects host bus 14 to a PCI bus 26. PCI bus 26 connects PCI devices 30 to host bridge 22. PCI bus 26 also connects to a PCI to PCI bridge 38. PCI to PCI bridge 38 in turn connects to PCI option cards 44 via PCI bus 42. A second PCI to PCI bridge 39 operates via PCI bus 48 to connect PCI devices 32 to PCI bus 42.

The bus that connects to a PCI to PCI bridge and is closest to the CPU is the primary bus and connects to the primary interface of the PCI to PCI bridge. Therefore, for PCI to PCI bridge 38, interface 36 is the primary interface and PCI bus 26 is the primary bus. Accordingly, interface 40 is the secondary interface and PCI bus 42 is the secondary bus. For PCI to PCI bridge 39, interface 37 is the primary interface and PCI bus 42 is the primary bus, while interface 41 is the secondary interface and PCI bus 48 is the secondary bus.

In a configuration such as that shown in FIG. 1, each PCI to PCI bridge and each PCI bus are numbered for identification. The PCI bus that is the secondary bus for the host bridge is given the name "PCI BUS 0." Therefore, PCI bus 26 is PCI BUS 0. The PCI to PCI bridge that uses PCI BUS 0 as its primary interface is given the name "PCI-PCI BRIDGE 1." This corresponds to PCI to PCI bridge 38. The PCI bus that acts as the secondary bus to a PCI to PCI bridge is given the number of that PCI to PCI bridge. Therefore, PCI bus 42 is called "PCI BUS 1" because it is the secondary bus to PCI-PCI BRIDGE 1 (PCI to PCI bridge 38). Each PCI to PCI bridge and each PCI bus is named in this fashion. Thus, for FIG. 1, PCI to PCI bridge 39 is named "PCI-PCI BRIDGE 2" and PCI bus 48 is "PCI BUS 2."

Electrical loading limits, as specified in the PCI Local Bus Specification, Revision 2.1, allow only ten PCI device loads per PCI bus. Therefore, a system that requires more than ten PCI device loads requires a PCI to PCI bridge. For example, in FIG. 1, a maximum of 10 PCI devices 30 may connect to PCI bus 26 and host bridge 22. However, PCI to PCI bridge 38 appears as one device to PCI bus 26 and host bridge 22. This allows option cards 44 that contain further PCI devices 32 to access PCI bus 26 and host bridge 22 maintaining the specified electrical loading limits.

In operation, if PCI device 32 initiates a transaction to memory 18, PCI device 32 is the master and memory 18 is the target. To complete the transaction, PCI device 32 acts as a master along PCI bus 48 to secondary interface 41 of PCI to PCI bridge 39. Then, primary interface 37 of PCI to PCI bridge 39 acts as a master to complete a transaction to secondary interface 40 of PCI to PCI bridge 38. Next, primary interface 36 of PCI to PCI bridge 38 initiates a transaction as master to secondary interface of host bridge 22. Host bridge 22 then acts as master for a transaction to memory 18.

Figure 2:
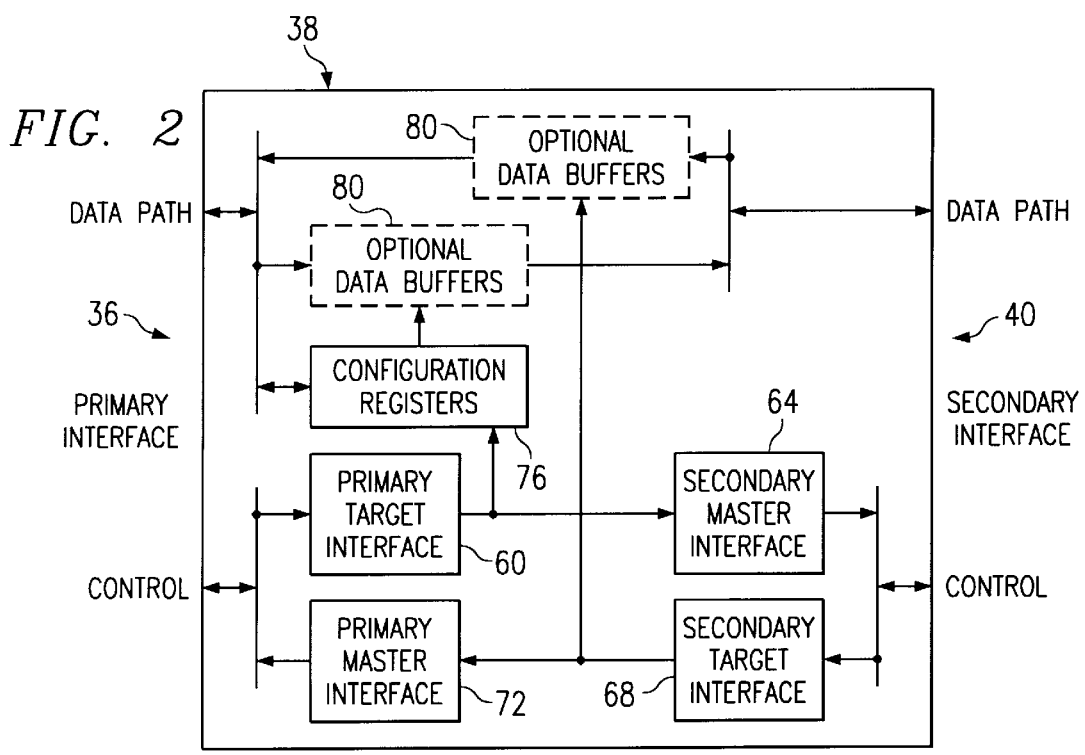
FIG. 2 is a functional block diagram of the typical operation of a PCI to PCI bridge.

FIG. 2 is a functional block diagram of the typical operation of a PCI to PCI bridge indicated generally at 38. Data moving downstream first encounters a primary interface 36. This action initiates a primary target interface 60. PCI to PCI bridge 38 is acting as the target of the transaction that is taking place on the primary bus. Next, a secondary master interface 64 is triggered, in order for PCI to PCI bridge 38 to act as the master of the transaction on the secondary bus. When a transaction moves upstream, a secondary target interface 68 is initiated. PCI to PCI bridge 38 is acting as the target of this transaction that is taking place on the secondary bus. Then a primary master interface 72 is initiated. Here, PCI to PCI bridge 38 acts as the master to the transaction on the primary bus. These transactions are affected by configuration registers 76 that determine the characteristics of PCI to PCI bridge 38. Furthermore, optional data buffers 80 may exist on PCI to PCI bridge 38 to buffer data involved in transactions across PCI to PCI bridge 38.

FIG. 3 is a functional block diagram of one embodiment of a PCI to PCI bridge that contains a secondary PCI bus internal arbiter according to the present invention. PCI to PCI bridge, indicated generally at 38, contains a primary interface 36 and a secondary interface 40. Primary pinouts 43 comprise the signals that interact with the primary bus on primary interface 36. Secondary pinouts 45 contain the signals that interface with the secondary bus and secondary interface 40. Secondary interface 40 also contains pinouts 45 that interact with a secondary PCI bus internal arbiter 100. PCI to PCI bridge 38 of this embodiment also contains configuration registers 76 and data buffers 80. In operation, PCI to PCI bridge 38 interprets the signals on primary pinouts 43 and secondary pinouts 45 in order to transmit transactions upstream and downstream.

As mentioned above, current PCI device specification requires the implementation of configuration registers for PCI devices. FIGS. 4A and 4B are diagrams, respectively, of the PCI device configuration header format and the PCI-to-cardbus bridge configuration register format. As shown in FIG. 4A, the PCI device configuration header format designates locations for various fields within the configuration registers. The registers within this range are used to identify the PCI device, to control the device's PCI functions, and to sense the devices' PCI status in a generic manner. As shown in FIG. 4B, the PCI-to-cardbus bridge configuration register format contains some similar fields as those in FIG. 4A. However, some of the similar fields are in different locations, and there are a number of different fields.

FIG. 5 is a block diagram of one embodiment of data storage associated with a PCI to PCI bridge and a connected PCI device. As shown, PCI to PCI bridge 38 provides an interface between a primary PCI bus 26 and a secondary PCI bus 42. Bridge 38 has a primary interface 36 and a secondary interface 40 as has been described. A plurality of PCI devices 30 are connected to secondary PCI bus 42 and are provided access to primary PCI bus 26 through bridge 38. PCI devices 30 can be regular PCI devices, PCI-Cardbus devices, or other appropriate PCI devices. In the illustrated embodiment, a data storage device 102 is associated with bridge 38. Data storage 102 stores configuration data for bridge 38 and can be, for example, a serial EEPROM. Also, a data storage device 104 is associated with the first PCI device 30, as shown. Data storage 104 similarly stores configuration data for the associated PCI device 30 and can be a serial EEPROM. It should be understood that other of the PCI devices 30 could also have associated data storage for storing configuration data.

According to the present invention, a scheme is implemented on bridge 38 that detects access to configuration registers of PCI devices 30 behind bridge 38 and can report data for PCI devices 30. In this manner, PCI devices 30 that reside on secondary PCI bus 42 do not have to implement their own data storage (e.g., serial EEPROM) interface to load configuration data. According to the present invention, data storage 102 associated with bridge 38 will load data from data storage 102 to configuration registers of bridge 38. Data storage 102 will also load information that identifies PCI devices 30 that are not capable of reporting complete configuration data. Bridge 38 can then detect access to the system registers of PCI devices 30 that do not implement the configuration registers and can report the data for them. If the information loaded from the data storage 102 indicates that there are PCI devices 30 behind the bridge 38 that are capable of reporting the configuration data (e.g., PCI device 0 which has associated data storage 104), bridge 38 can not trap access to those PCI devices 30 and, instead, can pass the access through to those PCI devices 30. If necessary, bridge 38 can delay accesses to the configuration space (e.g., via PCI delayed transaction mechanism) in which data is loaded from data storage 102 while the interface is busy loading the data. This ensures that bridge 38 will return valid data on reads from the configuration registers.

In one implementation of the present invention, primary interface 36 of bridge 38 handles the configuration register access. In this implementation, a device mask register is used to determine whether the PCI device is one for which the read should be trapped. The device mask register has a plurality of bits with each bit associated with a PCI device 30 connected to secondary PCI bus 42. A bit set to "0" indicates that a read to the associated PCI device 30 should not be trapped, and a bit set to "1" indicates that a read to the associated PCI device 30 should be trapped. In this implementation, if an access is to be trapped, a device type register is used to determine a type for the PCI device 30. The device type register has a plurality of bits with each bit associated with a PCI device 30. A bit set to "0" indicates that the associated PCI device is a regular PCI device, and a bit set to "1" indicates that the associated PCI device is a PCI-Cardbus bridge. It should be understood that, in other schemes, there may be other types of PCI devices in addition to these two. Based upon the device type, the configuration information (e.g., subsystem ID and subsystem vendor ID) is returned according to either the PCI device configuration header format (FIG. 4A) or the PCI to Cardbus bridge configuration register format (FIG. 4B). In this implementation, both the device mask register and the device type register can be loaded from data stored in data storage 102.

FIG. 6 is a flowchart of one embodiment of a method for intelligent configuration register access according to the present invention. In step 110, a read is identified to a subsystem ID and subsystem vendor ID (or other configuration register) of a connected PCI device. Then, it is determined whether the connected PCI device is one for which the read should be trapped. In the embodiment of FIG. 6, this determination is accomplished by checking the device type register, in step 112, and determining, in step 114, whether to trap the read based upon bit settings of the device mask register. If the read should not be trapped, then in step 116, the read is passed on to the connected PCI device. If the read should be trapped, then the type of PCI device is determined for the connected PCI device. In the illustrated embodiment, this is accomplished by checking the device type register, in step 118, and determining, in step 120, whether the device is a regular PCI device or a PCI-Cardbus based upon bit settings of the device type register. If it is a regular PCI device, then in step 122, the data representing the subsystem ID and subsystem vendor ID (or other configuration register information) is returned according to the PCI device configuration header format. If it is a PCI-Cardbus, then in step 124, the data representing the subsystem ID and subsystem vendor ID (or other configuration register information) is returned according to the PCI to Cardbus bridge configuration register format.

Although the present invention has been described in detail, it should be understood that various changes, substitutions and alterations can be made hereto without departing from the spirit and scope of the invention as defined by the appended claims.

What is claimed is:

1. A method for intelligent configuration register access on a PCI to PCI bridge, comprising:
   identifying a read to configuration information of a connected PCI device;
   determining whether the connected PCI device is one for which the read should be trapped;
   if the read should not be trapped, passing the read on to the connected PCI device; and
   if the read should be trapped, determining a type of PCI device for the connected PCI device and returning data representing the configuration information in a format appropriate for the type of PCI device.

2. The method of claim 1, wherein the configuration information is a subsystem ID and subsystem vendor ID of the connected PCI device.

3. The method of claim 1, wherein determining whether the connected PCI device is one for which the read should be trapped comprises checking a device mask register.

4. The method of claim 3, wherein the device mask register has a plurality of bits, each bit associated with a connected PCI device.

5. The method of claim 4, wherein a bit set to "0" indicates that a read to the associated connected PCI device should not be trapped, and a bit set to "1" indicates that a read to the associated connected PCI device should be trapped.

6. The method of claim 3, wherein the device mask register is loaded from data stored in a data storage device associated with the PCI to PCI bridge.

7. The method of claim 6, wherein the data storage device is an EEPROM device.

8. The method of claim 1, wherein determining a type of PCI device for the connected PCI device comprises checking a device type register.

9. The method of claim 8, wherein the device type register has a plurality of bits, each bit associated with a connected PCI device.

10. The method of claim 9, wherein a bit set to "0" indicates that the associated connected PCI device is a regular PCI device, and a bit set to "1" indicates that a the associated connected PCI device is a PCI-Cardbus.

11. The method of claim 10, wherein, if the connected PCI device is a regular PCI device, the configuration information is returned according to a PCI device configuration header format.

12. The method of claim 10, wherein, if the connected PCI device is a PCI-Cardbus, the configuration information is returned according to a PCI to Cardbus bridge configuration register format.

13. The method of claim 6, wherein the device type register is loaded from data stored in a data storage device associated with the PCI to PCI bridge.

14. The method of claim 13, wherein the data storage device is an EEPROM device.

15. A PCI to PCI bridge apparatus having intelligent configuration register access, comprising:
   a primary interface for operable to communicate with PCI devices connected to a primary PCI bus;
   a secondary interface for operable to communicate with PCI devices connected to a secondary PCI bus;
   the primary interface further operable:
   to identify a read to configuration information of a PCI device connected to the secondary PCI bus;
   to determine whether the PCI device is one for which the read should be trapped;

if the read should not be trapped, to pass the read on to the PCI device; and if the read should be trapped, to determine a type for the PCI device and to return data representing the configuration information in a format appropriate for the type of PCI device.

16. The PCI to PCI bridge apparatus of claim 15, wherein the configuration information is a subsystem ID and subsystem vendor ID of the PCI device.

17. The PCI to PCI bridge apparatus of claim 15, further comprising a device mask register, and wherein the primary interface determines whether the PCI device is one for which the read should be trapped by checking the device mask register.

18. The PCI to PCI bridge apparatus of claim 17, wherein the device mask register has a plurality of bits, each bit associated with a PCI device connected to the secondary PCI bus.

19. The PCI to PCI bridge apparatus of claim 18, wherein a bit set to "0" indicates that a read to the associated PCI device should not be trapped, and a bit set to "1" indicates that a read to the associated PCI device should be trapped.

20. The PCI to PCI bridge apparatus of claim 17, further comprising a data storage device associated with the PCI to PCI bridge, and wherein the device mask register is loaded from data stored in the data storage device.

21. The PCI to PCI bridge apparatus of claim 20, wherein the data storage device is an EEPROM device.

22. The PCI to PCI bridge apparatus of claim 15, further comprising a device type register, and wherein the primary interface determines a type for the PCI device by checking the device type register.

23. The PCI to PCI bridge apparatus of claim 22, wherein the device type register has a plurality of bits, each bit associated with a PCI device connected to the secondary PCI bus.

24. The PCI to PCI bridge apparatus of claim 23, wherein a bit set to "0" indicates that the associated PCI device is a regular PCI device, and a bit set to "1" indicates that a the associated PCI device is a PCI-Cardbus.

25. The PCI to PCI bridge apparatus of claim 24, wherein, if the PCI device is a regular PCI device, the primary interface returns the configuration information according to a PCI device configuration header format.

26. The PCI to PCI bridge apparatus of claim 24, wherein, if the PCI device is a PCI-Cardbus, the primary interface returns the configuration information according to a PCI to Cardbus bridge configuration register format.

27. The PCI to PCI bridge apparatus of claim 22, further comprising a data storage device associated with the PCI to PCI bridge, and wherein the device type register is loaded from data stored in the data storage device.

28. The PCI to PCI bridge apparatus of claim 27, wherein the data storage device is an EEPROM device.

* * * * *